Patented Sept. 13, 1949

2,481,758

UNITED STATES PATENT OFFICE 2,481,758

MONO-ARYL ISOMELAMINES

Donald W. Kaiser, Riverside, and Daniel E. Nagy, Stamford, Conn., assignors to American Cyanamid Company, New York, N. Y., a corporation of Maine No Drawing. Application September 14, 1944, Serial No. 554,155

13 Claims. (Cl. 260—249.5)

This invention relates to new organic compounds and to methods of preparing the same. More particularly, it relates to mono-substituted isomelamines and their preparation.

We have found that primary amines may be caused to react with 1,3-dicyanoguanidine and its salts in the presence of an acid to yield substituted isomelamines. The reaction may be illustrated by means of the following equation:

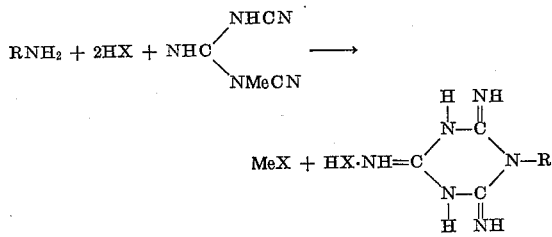

In the equation, R represents a substituted or unsubstituted aromatic or aliphatic radical; X represents an acidic salt-forming radical; and Me represents hydrogen or a metal, ammonium or amine radical.

The mono-substituted isomelamines of the present invention are characterized by having the substituent group directly attached to a nitrogen atom of the heterocyclic ring. They differ structurally from substituted normal melamines in that the latter have their substituent on a nitrogen atom not in the ring. The isomelamines may be designated as esomelamines whereas the normal melamines are designated exomelamines, the terms eso and exo indicating whether the substituent is on the ring (eso) or outside the ring (exo). The mono-substituted isomelamines of the present invention, in common with many complex heterocyclic compounds, probably exist in several tautomeric forms. Accordingly, the structure illustrated is intended to represent the most probable tautomeric form of the mono-substituted isomelamine. As will be understood by those skilled in the art, changes in tautomeric form are influenced by numerous factors, and under certain conditions a quantity of the substance may contain two or more tautomers at the same time.

Although the equation shows the direct formation of the mono-substituted isomelamine from the reactants, it will be understood that we do not represent that the reaction takes place in this direct manner. It is quite likely that one or more intermediate compounds may be formed which react further with themselves or each other or rearrange to yield mono-substituted isomelamines. We have not been able, as yet, to isolate any of such hypothetical intermediates and cannot state with certainty whether or not such intermediates are formed during the course of the reaction. We have found, however, that mono-substituted isomelamines are formed and can be easily isolated from the reaction mixture, and this discovery constitutes the present invention.

The mono-substituted isomelamines of the present invention are, with few exceptions, rather strong bases. When purified, they are in the form of dense, colorless crystals which are insoluble in cold water and most organic solvents. They readily form salts with acids which salts are neutral and somewhat water-soluble. The solubility of the salt is depressed by the presence of inorganic salts. Both the free base and the salts melt with decomposition at fairly high temperatures.

The isomelamines of the present invention are useful organic compounds and may be used as intermediates in the synthesis of various other useful organic compounds, such as resins, syntans, dyes, etc. They may be readily converted to the normal melamines which are known compounds having well recognized utility. Other uses of these novel compounds will occur to those skilled in the art.

In preparing the new isomelamines in the present invention we may use any primary aliphatic or aromatic amine. Since a large number of representative amines of this class are specifically illustrated in the examples which follow, further mention of other suitable primary amines appears to be unnecessary at this point.

The 1,3-dicyanoguanidines which may be used by us in our new reaction are described in the copending application of Donald W. Kaiser and Jack T. Thurston, Serial No. 524,072, filed February 26, 1944, Patent 2,371,100, issued March 6, 1945. These compounds are prepared by mixing together dicyandiamide, a water-soluble alkali metal or alkaline earth metal hydroxide in the presence of acetone and thereafter adding cyanogen chloride. Ordinarily the product is obtained in the form of an alkali metal or alkaline earth metal salt, but the free acid may be obtained by neutralizing the alkali metal or alkaline earth metal salt-forming group with a strong inorganic acid. Various other metal, ammonium and amine salts of 1,3-dicyanoguanidine may be prepared by neutralization of the free acid or by methods of double decomposition. Since the 1,3-dicyanoguanidine is most easily obtained in the form of one of its alkali metal salts, we prefer to use the alkali metal salts of 1,3-dicyanoguanidine in our new reaction in the preparation of substituted isomelamines.

In order to cause a reaction between the primary amine and the 1,3-dicyanoguanidine, it is necessary that an acid be present. Best results are obtained when a strong acid, such as hydrochloric, sulfuric, nitric, phosphoric, trichloracetic, etc., is used. As will appear from the above equation, 2 mols (2 equivalents) of a monovalent acid are required: 1 mol for neutralization of the basic isomelamine and 1 mol for reaction with the monovalent salt-forming radical of the 1,3-dicyanoguanidine (when such is used). When divalent acids are used, 1 mol (representing 2 equivalents) is sufficient.

Part of the acid may be supplied by the use of an amine salt. If an acid salt of a volatile amine is used and the reaction is conducted in such manner that the pH is prevented from rising above about 9, as by volatilization and removal of the free amine liberated during the reaction, the entire acid requirements of the reaction may be furnished by the amine salt. Similarly, we may use an ammonium salt to supply the acid, ammonia being liberated and volatilized during the course of the reaction, as in the case of the volatile amine.

It may also be noted that, when using the free 1,3-dicyanoguanidine, the acid requirements of the reaction are reduced by one equivalent of acid. Also, if for some reason it is not desired to bring the reaction to full completion, less than 2 equivalents of the acid may be used.

The new reaction of the present invention may be conducted within the pH range of about 1 to 9. pH values greater than 9 are to be avoided during the reaction because of the tendency of the isomelamines to isomerize to yield normal melamines. At pH values less than one, normal melamines are obtained. When using primary arylamines to produce mono-aryl substituted isomelamines, the reaction takes place best within the range of pH 3 to pH 6. When using aliphatic primary amines to produce mono-aliphatic substituted isomelamines, the best results are obtained when the pH is maintained close to neutrality. This may be accomplished by adding the second mol of the acid at such rate, as the reaction proceeds, that sufficient acid radical is supplied to form a substantially neutral salt with the product as it is formed.

The reaction is usually conducted at temperatures of from about 60° C. to 200° C., preferably at about 90° to 140° C. At the higher temperatures the reaction is more rapid, but these higher temperatures may necessitate the use of pressure vessels and may lead to undue decomposition of the intermediates and the reaction product. The reaction at room temperatures is too slow to be of practical value.

As will appear from the specific examples, the reaction may take place either in a solvent or without. Water, β-ethoxy ethanol, dioxane, xylene, and other inert organic liquids may be used. When preparing mono-aryl substituted isomelamines water is the preferred solvent although a water-organic liquid solvent mixture may be employed or no solvent at all. When preparing aliphatic-substituted isomelamines, the reaction is preferably conducted in the absence of water although not necessarily so. The reaction between primary aliphatic amines and 1,3-dicyanoguanidines may be made to take place by merely mixing the two materials and heating in the presence of a substance which furnishes an acidic radical; for example, ammonium chloride. Of course, this reaction may also take place in the presence of non-aqueous solvents or mixtures thereof and, with decreased yields, in the presence of water.

Our invention will now be illustrated by means of the following examples in which representative primary aliphatic and primary aryl amines are caused to react with 1,3-dicyanoguanidine in the presence of various acids and acid radical-furnishing materials. Parts are by weight unless otherwise specified.

EXAMPLE 1

*Phenylisomelamine*

A mixture of 2520 g. of dicyandiamide and 5 gal. of acetone was cooled to 10° C., and 4082 g. of 85% potassium hydroxide pellets was added. The mixture was stirred for a half hour and then cooled to 0° C., whereupon 1570 cc. of cyanogen chloride (30 mols) was added at such a rate that the temperature of the reaction mixture did not rise above 8° C. After addition of the cyanogen chloride, the stirring was continued for about one hour, at which time the product was of a fine cream-like consistency. 250 cc. of glacial acetic acid was then added, the solid was filtered and washed with a gallon of acetone. The product was a nearly colorless powder weighing, when dried, 6617 g., containing substantially equal molecular proportions of mono-potassium 1,3-dicyanoguanidine and potassium chloride. This crude material was used in many of the examples which follow, it having been found unnecessary to separate the potassium chloride from the potassium dicyanoguanidine. In other examples, however, substantially pure potassium 1,3-dicyanoguanidine was separated from the potassium chloride by recrystallization from water and the pure product used.

In a three-necked flask, heated on a steam bath, and fitted with agitator, thermometer, reflux condenser and dropping funnel was placed 21.5 g. (0.22 mol) of aniline. To this was added 50 cc. of water, one-half of a diluted acid made by mixing 35 cc. concentrated hydrochloric acid with 100 cc. of water, and 29 g. (0.2 mol) of monopotassium salt of 1,3-dicyanoguanidine. When the temperature had reached 92° C., the solution was clear and the rest of the diluted acid was added dropwise during the next one-half hour. Frequent tests with pH paper showed the pH remained in the region 3 to 4 until all but the last few cc.'s of acid had been added. The formation of a mist of aniline hydrochloride at the tip of the acid dropping funnel also persisted until almost all of the acid had been added. The last few cc.'s of acid were added slowly until the pH had dropped to about one and remained there for 5 minutes. The hot solution was filtered, cooled, the precipitated product filtered, washed with a little ice water and air-dried. The yield of crude phenylisomelamine hydrochloride was quantitative. After recrystallization from water, it decomposed at 318° C.

Phenylisomelamine was prepared by adding excess alkali to a water suspension of the hydrochloride. It decomposed at 232° C. Analysis for carbon, hydrogen, and nitrogen gave values in close agreement with the theoretical values for phenylisomelamine. Comparison with a known sample of phenylmelamine showed that the new product was not a normal melamine. Raman spectra analysis and failure to obtain a colored copper-biguanide complex proved the absence of nitrile groups.

When an equivalent amount of diluted sulphuric acid was used in place of the hydrochloric acid a quantitative yield of the sulphate salt of phenylisomelamine was obtained.

EXAMPLE 2 p-Ethoxyphenylisomelamine

To a mixture of 57.5 g. (0.4 mol) of phenetidine, 100 cc. of water and one-half of a diluted acid made by mixing 68 cc. (0.8 mol) of concentrated hydrochloric acid with 200 cc. water was added 58 g. (0.4 mol) of mono-potassium 1,3-dicyanoguanidine. The mixture was heated to about 90° C. and the remainder of the diluted acid added dropwise until a pH of about 1 was obtained for a five minute period. The solution was filtered and cooled, the precipitated product filtered, washed with a little ice water and air-dried. The para ethoxyphenylisomelamine hydrochloride was converted to p-ethoxyphenylisomelamine by treatment in water with an excess of alkali. The free base was much less soluble and precipitated immediately as a very finely divided white solid upon the addition of alkali. A yield of 87.5% of p-ethoxyphenylisomelamine with a melting point of 265° C. was obtained.

EXAMPLE 3 o-Bromophenylisomelamine

To a stirred mixture of 17.2 g. (0.10 mol) of o-bromoaniline, 25 g. of crude mono-potassium 1,3-dicyanoguanidine containing 0.11 equivalents of potassium 1,3-dicyanoguanidine and 100 cc. of water at 100° C. was added during one hour, 35 cc. of dilute hydrochloric acid (17 cc. concentrated hydrochloric acid diluted with water to 35 cc.). The amount of insoluble bromaniline decreased as the acid was added, but a portion was left at the end. After the mixture was cooled to room temperature the white solid and oil was filtered and washed with acetone to remove the oil. Further cooling of the original filtrate precipitated 4 g. of white solid which was combined with the 15 g. obtained from the first filtration, giving a crude yield of 19 g. or 60% of the theoretical yield of o-bromophenylisomelamine hydrochloride. It decomposed at 305°–308° C. and when crystallized from hot water this melting point was unaltered. The hydrochloride salt was soluble in methanol. A portion of the hydrochloride was suspended in water and made alkaline. The precipitated white crystalline free base, which decomposed at 250° C., was a strongly alkaline substance. The free base was insoluble in water and acetone.

EXAMPLE 4

2,5-Dichlorophenylisomelamine

A mixture of 28.5 g. (0.144 mol) of 2,5-dichloroaniline hydrochloride and 35 g. of crude mono-potassium 1,3-dicyanoguanidine (0.144 mol) was ground well together and then heated in a large test tube on a steam bath. At about 50–60° C. the dry mixture became soft and the temperature increased rapidly to 115° C. In about five minutes the temperature had dropped to 98° C., and the now solid contents of the test tube were broken up in water which contained 0.2 mol of alkali. The alkaline solution was filtered, and upon neutralization there was precipitated 14 g. of the dicyanoguanidine salt of 2,5-dichlorophenylisomelamine. This product was found to decompose at 223° C. It was soluble in alkali, somewhat soluble in dilute acid, and insoluble in acetone. The free 2,5-dichlorophenylisomelamine was obtained when a solution of the dicyanoguanidine salt was made alkaline. The free 2,5-dichlorophenylisomelamine was water-insoluble, and a sample when heated decomposed at around 240° C.

EXAMPLE 5 o-Hydroxyphenylisomelamine

The thick slurry of 163 g. (1.5 mols) of o-aminophenol and 351 g. (1.5 mols) of crude mono-potassium 1,3-dicyanoguanidine in 500 cc. of water was heated to 100° C. and 255 cc. of hydrochloric acid previously diluted with water to 500 cc. was added slowly with good stirring during one hour and ten minutes. After about 300 cc. of the acid had been added, the last of the o-aminophenol dissolved and crystalline solid began to precipitate. The pH of the solution remained above 3 to 4 as tested on pH paper, until all but 30 cc. of the acid had been added, when it dropped to one. The last 30 cc. of acid was not added. Charcoal was added to the black-colored mixture and it was filtered hot. On cooling, the precipitate was filtered and recrystallized from 500 cc. of hot water to yield 44.4 g. of brown-colored hydrochloride salt.

The large amount of precipitate insoluble in the hot reaction mixture was recrystallized from a liter of hot water to yield 171 g. of light tan-colored hydrochloride salt.

The two filtrates, amounting to 1700 cc., were combined, 200 g. of salt added, and cooled well in ice to give 48 g. of red-brown colored hydrochloride salt.

The combined yield of the three fractions was 69%. The o-hydroxyphenylisomelamine hydrochloride was quite soluble in water giving a solution neutral to pH paper, and was also soluble in methanol, but insoluble in acetone. A portion of the hydrochloride salt was dissolved in water and treated with dilute alkali until the pH was about 7.5. The white o-hydroxyphenylisomelamine free base gradually precipitated and was found to be quite insoluble in water, methanol and acetone but soluble in excess alkali. It decomposed at 255°–257° C. when heated.

EXAMPLE 6

M-Nitrophenylisomelamine

To a mixture of 27.6 g. (0.2 mol) of m-nitroaniline, 50 g. (0.22 mol) of crude mono-potassium 1,3-dicyanoguanidine and 150 cc. of water at a temperature of 95° C. was added during one hour and ten minutes 126 cc. (0.4 mol) of 20% nitric acid. The m-nitroaniline gradually dissolved during the addition of the acid, giving a clear red solution at the end, from which the product, as the nitrate salt, was precipitated by cooling in a yield of 35 g. or 56.5%. The nitrate salt decomposed at 280° C. while the m-nitrophenylisomelamine free base decomposed at 241° C. Both were light yellow in color and insoluble in cold water.

EXAMPLE 7 p-Nitrophenylisomelamine

After the mixture of 27.6 g. (0.2 mol) of p-nitroaniline, 50 g. (0.22 mol) of crude mono-potassium 1,3-dicyanoguanidine and 150 cc. water had been heated to 103° C. 126 cc. (0.4 mol) of 20% nitric acid was added dropwise, with vigorous stirring, during one hour and twenty-five minutes. Most of the p-nitroaniline dissolved during this addition, and at the end the solution was treated with charcoal, filtered and cooled. A precipitate of 28 g. or 45% of nitrate salt was obtained. It was transformed into the free base by suspending it in water and adding an excess of alkali. The free base was filtered, washed with water and methanol, to remove traces of unreacted p-nitroaniline, and then dried in a vacuum desiccator. This p-nitrophenylisomelamine base was faintly yellow in color, weakly alkaline and decomposed at 262–265° C.

EXAMPLE 8 p-Arsonophenylisomelamine

A mixture of 28.18 g. (0.13 mol) arsanilic acid, 30.5 g. (0.13 mol) of crude mono-potassium 1,3-dicyanoguanidine and 150 cc. water was heated to 97° C. To this mixture was added 22 cc. of concentrated hydrochloric acid previously diluted with 31 cc. of water, dropwise during one half hour. The insoluble arsanilic acid gradually dissolved and at the end a precipitate of the hydrochloride of p-arsonophenylisomelamine was formed. After the solution was cooled the precipitate was filtered and amounted ot 36 g. or a 76.5% yield as the hydrochloride salt. To make the free base this salt was suspended in water and an equivalent of dilute alkali added. The p-arsonophenylisomelamine free base did not melt below 320° C., and was fairly soluble in hot water and cold solutions of alkalis.

EXAMPLE 9

2-methyl-4-isopropylphenylisomelamine

The mixture of 29.8 g. (0.2 mol) of 2-cymidine (2-methyl-4-isopropylaniline), 50 g. (0.22 mol) of crude mono-potassium 1,3-dicyanoguanidine and 150 cc. of water was heated to 104° C. and within a period of 45 minutes 34 cc. (0.4 mol) of concentrated hydrochloric acid previously diluted with 66 cc. of water was added with stirring. All but a trace of 2-cymidine had dissolved at the end, and the neutral solution was treated with charcoal and filtered. On cooling only a slight amount of flocculent impurity was deposited which was filtered and then the filtrate was made alkaline with 0.25 mol of sodium hydroxide. The fluffy, white precipitate of 2-methyl-4-isopropylphenylisomelamine which formed was filtered, washed with cold water, and dried in a vacuum desiccator to give 31 g. or a 60% yield of product. The product was quite soluble in cold methanol and was strongly alkaline.

EXAMPLE 10 o-Tolylisomelamine

To a mixture of 32.1 g. (0.3 mol) of o-toluidine, 74 g. (0.31 mol) of crude mono-potassium 1,3-dicyanoguanidine and 175 cc. of water was added at 100° C. during one-half hour 51 cc. (0.60 mol) of concentrated hydrochloric acid previously diluted with 74 cc. of water. After the clear solution, which was neutral, had been cooled for some time in an ice bath, the hydrochloride salt of o-tolylisomelamine precipitated and was then filtered and washed with a small amount of cold water. A yield of 40 g. or 53% of the theoretical was obtained. The hydrochloride salt was quite soluble in water and decomposed at 304° C. The hydrochloride treated with an equivalent of alkali gave the o-tolylisomelamine free base which was strongly alkaline and decomposed at 255° C.

EXAMPLE 11 p-Sulfonamidophenylisomelamine

A stirred mixture of 351 g. (1.50 mols) of 94.4% potassium dicyanoguanidine which contained an equal molar quantity of potassium chloride, 258 g. (1.50 mols) of sulfanilamide, and 400 cc. of water was heated to 85° and then slowly acidified with 300 g. (3.0 mols) of concentrated hydrochloric acid. A clear yellow solution resulted after about half of the acid was added and then solid began to separate. During acidification external heating was stopped and the temperature slowly climbed to 100°. After reaction was over, the mixture was cooled in an ice bath, the solid filtered, washed with ice water and dried in an oven at 80°. An 88% yield of product, decomposing at 330° was obtained. Crystallization from hot water raised the decomposition point of the p-sulfonamidophenylisomelamine hydrochloride to 333°. The free base was found to decompose at 272–273°.

EXAMPLE 12

α-Naphthylisomelamine 28.6 g. (0.2 mol) of α-naphthyl amine and 32 g. (0.22 mol) of potassium 1,3-dicyanoguanidine in 100 cc. of water was heated on the steam bath. When the temperature of the mixture had reached 92° C. a total of 35 cc. (0.42 mol) of concentrated hydrochloric acid, diluted to 100 cc. with water, was added slowly, with stirring. The pH of the reaction mixture remained at 3 to 4 until almost all of the acid had been added. Some of the product precipitated from the hot reaction mixture as the hydrochloride of α-naphthylisomelamine. On cooling the remainder of the product crystallized. The free base α-naphthylisomelamine was basic and melted with decomposition at 260° C.

EXAMPLE 13 p-Aminophenylisomelamine and p-phenylenediisomelamine 27 g. (0.25 mol) of p-phenylenediamine, 59 g. (0.25 mol) of potassium 1,3-dicyanoguanidine which contained a molar equivalent of potassium chloride and 150 cc. of water was heated on a steam bath. 50 cc. (0.59 mol) of concentrated hydrochloric acid, which was diluted with water, was then added slowly to the stirred mixture. When about two-thirds of the acid had been added, then a precipitate, which was the dihydrochloride of the phenylenediisomelamine, began to form. At the end the diisomelamine salt was filtered from the hot solution and when the filtrate was cooled the hydrochloride of the p-aminophenylisomelamine crystallized.

p-Phenylenediisomelamine decomposed at 220–230° C. and formed a dihydrochloride which was exceedingly insoluble in hot water. The diacetate was more soluble.

p-Aminophenylisomelamine, free base, was a strong base and quite soluble in water. It melted with decomposition at 265° C.

When the above experiment was run with twice the amount of potassium 1,3-dicyanoguanidine, then the p-phenylenediisomelamine was the sole product.

EXAMPLE 14 p-Sulfophenylisomelamine

A mixture of 234 g. (1.0 mol) of potassium 1,3-dicyanoguanidine which contained a molar equivalent of potassium chloride, 191 g. (1.0 mol)

of sulfanilic acid monohydrate, and 500 cc. of water was stirred and heated on a steam bath. At 85° C. almost complete solution occurred and then finely divided solid began to separate. 100 g. (1.0 mol) of concentrated hydrochloric acid was then slowly added and the temperature gradually climbed to 104°. After addition, the mixture was cooled in an ice bath, the colorless solid filtered, washed with ice water, and dried in an oven at 110°. The yield of infusible p-sulfophenylisomelamine was 244 g. or 86.5% of the theoretical.

Example 15
Butylisomelamine

Into a three-necked flask equipped with mechanical stirrer, reflux condenser, thermometer in liquid, dropping funnel, and dropper for removing samples was placed a mixture of 21 cc. (0.21 mol) of butylamine and 100 cc. of $\beta$-ethoxy ethanol which had been neutralized with a portion of a mixture of 10 g. of sulfuric acid in 25 cc. $\beta$-ethoxy ethanol. To this was added 46.8 g. (0.2 mol) of crude mono-potassium 1,3-dicyanoguanidine and the flask heated with an oil bath. When the liquid temperature had reached 114° C. the rest of the acid was added at such a rate that a sample of the liquid remained faintly blue to bromthymol blue. Further acid (10 g. of sulfuric acid in 25 cc. $\beta$-ethoxy ethanol was added in this manner during the next half hour, during which time the temperature was gradually raised to 130° C. The liquid now no longer turned the indicator blue so the last portion of the acid was added very slowly during the next two hours. The vapors during this time were always alkaline.

After standing over night the solid was filtered, washed with acetone, and dried in an oven. The yield was 60 g. of white solid which was placed in 300 cc. of water, made alkaline with 20 cc. of 50% sodium hydroxide, stirred while in an ice bath, filtered, and washed with ice water. After drying in the vacuum desiccator there was obtained 28 g. or a 77% yield of butylisomelamine which decomposed at 230-231° C.

Example 16
Butylisomelamine

A solution containing 0.4 mol of butylamine sulfate was prepared from 40 cc. of butylamine, 20 g. of sulfuric acid, and 100 cc. of $\beta$-ethoxy ethanol. To this solution was added 46.8 g. (0.2 mol) of crude potassium 1,3-dicyanoguanidine and 10 cc. of water. The reaction mixture was then heated on an oil bath in a three-necked flask equipped with a stirrer, a dropping funnel, thermometers, and a short distilling head and condenser. The rate of heating was so adjusted that about 1 cc. of liquid distilled per minute. During the early stages of the distillation the water was distilled off and thereafter $\beta$-ethoxy ethanol containing free butylamine was taken off. The quantity of butylamine in the distillate was determined from time to time. Fresh $\beta$-ethoxy ethanol was added at intervals to keep the volume in the flask approximately constant. The mixture was heated for two hours at a temperature of between 121 to 135° C.

After the reaction mixture was cooled and filtered the solid reaction product was dried. It was then put in about 300 cc. of water, excess alkali added, and, after stirring in an ice bath for sometime, the crystalline product, butylisomelamine, was filtered, washed with ice water, and dried. A yield of butylisomelamine representing a theoretical yield of 71.5% was obtained.

An experiment similar to the above was run in which no water was employed and the solvent consisted of equal volumes of $\beta$-ethoxy ethanol and xylene. Butylisomelamine was obtained with a yield of 77.5% of theoretical.

Other experiments were run in which xylene and dioxane were the sole solvent media. Butylisomelamine was obtained in each case.

Example 17
Butylisomelamine

A dry mixture of 765 g. (7.0 mols) of butylamine hydrochloride and 782 g. (3.34 mols) of crude mono-potassium 1,3-dicyanoguanidine was placed in a dry enameled pot on a large steam bath. The mixture was heated at an internal temperature of 98° C. for two and one-half hours during which time it became brown and, at the end, almost solid. The solid was allowed to cool, broken up, and spread out in thin layers in two flat trays. The trays were heated at 90° C. in a forced draft oven for one and one-half hours. The temperature was then raised to 135° C. and heating continued for three more hours. The solid was pulverized and suspended in two liters of water, made alkaline with 400 cc. or 5 mols of 50% sodium hydroxide, and filtered after being stirred mechanically for about an hour. The precipitate of the crude butylisomelamine was washed with 500 cc. of cold water, then suspended in two liters of water, and made neutral with concentrated hydrochloric acid, 200 cc. or 2.44 mols being required. The semi-solid mass was then heated to 95° C. to form a clear solution, which was treated with charcoal, filtered and cooled. On acidifying with hydrochloric acid the butylisomelamine hydrochloride immediately precipitated. The product was filtered, washed with 500 cc. of ice water, and air dried. The yield of colorless material decomposing at 310° C. was 450 g. or 61.5%.

Example 18
Ethylisomelamine

A mixture of 300 g. (4 mols) of ethylamine hydrochloride and 410 g. (1.75 mols) of crude mono-potassium 1,3-dicyanoguanidine was placed in a two liter beaker in a deep steam bath and after fifteen minutes the inside temperature was 96° C. and the material was a thin white paste. The inside temperature rose to 101° C. and the heating was continued for twenty hours. The dry material was broken up, spread out on flat trays in a forced draft oven and heated to 135° C. for five hours. The dry material was then worked up as for the butylisomelamine hydrochloride, to obtain 204 g. or a 61.5% yield of ethylisomelamine hydrochloride which decomposed at 312° C.

Example 19
Laurylisomelamine

To 300 cc. of methanol containing 20 cc. of water was added 555 g. (3.0 mols) of laurylamine. The mixture was then heated in a steam bath with 375. g. (7.0 mols) of ammonium chloride until the thin liquid became a thick wax. This material was then mixed with 702 g. (3.0 mols) of powdered crude mono-potassium 1,3-dicyanoguanidine and put through a grinder three times to make the mixture as uniform as possible. It was then heated in a steam bath for about forty hours. The material was then broken up and put through a roller mill. It was placed in large trays and heated in a forced draft oven at 130° C. for four hours. The material was broken up and stirred for one hour with 150 cc. of acetone and filtered, followed by washing with 800 cc. of acetone. The almost white product was stirred with 2500 cc. of water, filtered, and washed well with cold water and suspended in 1800 cc. of water.

EXAMPLE 20

*Laurylisomelamine*

To a mixture of 55.3 g. (0.3 mol) of laurylamine, 15 g. (0.3 equiv.) of sulfuric acid and 450 cc. of $\beta$-ethoxy ethanol was added 70.2 g. (0.30 mol) of crude powered mono-potassium 1,3-dicyanoguanidine with stirring at room temperature. After ten minutes the mixture became thinner. Then was added 17 g. (0.31 mol) of ammonium chloride and the mixture heated to reflux in an oil bath and with a stream of air bubbling into the $\beta$-ethoxy ethanol to sweep out the ammonia. After heating with stirring for about eleven hours, the rate of ammonia evolution was much lower, so heating was stopped and the solid was filtered from the cold solution. After further purification and recrystallization, there was obtained 36 g. of laurylisomelamine hydrochloride representing a 52% yield.

A portion of the hydrochloride salt was further purified by recrystallization from hot water containing 30% $\beta$-ethoxy ethanol. It decomposed at 314° C. with previous softening. The free base was made from this hydrochloride by treating the latter in $\beta$-ethoxy ethanol with alkali, diluting with water and filtering. The free base decomposed at 225° C. and was soluble in $\beta$-ethoxy ethanol, somewhat soluble in methanol and acetone and insoluble in water.

EXAMPLE 21

*$\beta$-Hydroxyethylisomelamine*

A mixture of 12.2 g. (0.2 mol) of ethanolamine and 150 cc. of $\beta$-ethoxy ethanol was first neutralized with 10 g. of sulfuric acid and then was added 46.8 g. (0.2 mol) of crude mono-potassium 1,3-dicyanoguanidine and 11.0 g. (0.206 mol) of ammonium chloride. The mixture was heated in an oil bath, with mechanical stirring, to a liquid temperature of 130–132° C. Ammonia was evolved continuously during an eight hour heating period, a current of air being forced through the liquid to aid in its removal. The mixture was cooled, the solid filtered and washed with acetone and dried, to give a yield of 70 g. This solid was treated with 20 cc. of 50% sodium hydroxide in 300 cc. of water and, after stirring in an ice bath, the fine white solid was filtered. The solid was suspended in 300 cc. of water and neutralized with concentrated hydrochloric acid. This neutral mixture was then heated to boiling and further diluted to about 800 cc. with water to form a clear solution. On cooling, this solution deposited 22.4 g. of the hydrochloride of $\beta$-hydroxyethylisomelamine which corresponded to a yield of 54.5%. This compound decomposed at 271–272° C.

EXAMPLE 22

*$\beta$-Hydroxyethylisomelamine*

To 400 cc. of methanol and 20 cc. of water was added 185 g. (3.0 mols) of ethanolamine and 375 g. (7.0 mols) of ammonium chloride and the mixture was heated in an open flask until no more frothing took place. On cooling, the liquid solidified and was mixed with 702 g. (3.0 mols) of crude mono-potassium 1,3-dicyanoguanidine. The powdery mixture was heated at 100° C. in a steam bath over night. The material was then transferred to a forced draft oven and heated at 135° C. for four hours. The brittle material was powdered and stirred with 1400 cc. of water containing 40 cc. of concentrated hydrochloric acid for a number of hours. The solid was then filtered and treated with 800 cc. of water, first being heated to 90° C. and then cooled and 15 cc. of concentrated acid added. The product was filtered, dissolved in water, filtered, and cooled. The flocculent precipitate which formed was dissolved by adding sufficient hydrochloric acid to lower the pH to about 1. After standing for sometime in an ice bath the $\beta$-hydroxyethylisomelamine hydrochloride salt precipitated slowly and was filtered. The solid was then crystallized from 800 cc. of water and on heating decomposed at 260–263° C. A purer sample made in $\beta$-ethoxyethanol decomposed at 271° C.

We claim:

1. Substantially pure mono-substituted isomelamines having the formula

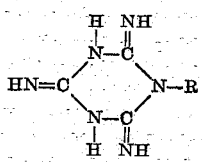

in which R is a radical of the group consisting of aromatic and aliphatic radicals.

2. Substantially pure mono - aliphatic-substituted isomelamines having the formula

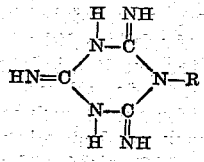

in which R is an aliphatic radical.

3. Substantially pure mono - aromatic-substituted isomelamines having the formula

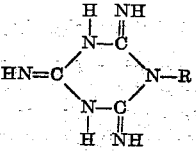

in which R is an aromatic radical.

4. Substantally pure mono-phenyl isomelamine having the formula

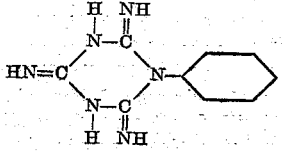

5. Substantially pure mono - butyl isomelamine having the formula

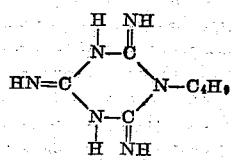

6. A method of preparing mono-substituted isomelamines which comprises the step of bringing together and causing to react at a pH within the range 1 to 9 a primary amine, a strong acid, and 1,3-dicyanoguanidine.

7. A method of preparing mono-substituted isomelamines which comprises the step of bringing together and causing to react at a pH within the range 1 to 9 a primary amine, a strong acid, and an alkali-metal 1,3-dicyanoguanidine.

8. A method of preparing mono-aliphatic-substituted isomelamines which comprises the steps of mixing together and heating at a pH close to neutrality a primary aliphatic amine, a substance which liberates a strong acid on heating, and a salt of 1,3-dicyanoguanidine.

9. A method of preparing mono-aryl-substituted isomelamines which comprises the steps of mixing together and heating at a pH within the range 3 to 6 a primary aryl amine, a strong acid, water, and a salt of 1,3-dicyanoguanidine.

10. A method of preparing mono-substituted isomelamines which comprises the steps of mixing together and heating to a temperature of at least 60° C. at a pH within the range 1 to 9 a primary amine, a salt of 1,3-dicyanoguanidine, and a substance which liberates a strong acid when heated above 60° C.

11. A method of preparing mono-phenyl isomelamines which comprises the steps of mixing together and heating to a temperature of at least 60° C. at a pH within the range 1 to 9 in the presence of water a primary phenyl amine, hydrochloric acid, and mono-potassium 1,3-dicyanoguanidine.

12. A method of preparing mono-butyl isomelamine which comprises the steps of mixing together and heating to a temperature of at least 60° C. at a pH within the range 1 to 9 a butyl amine salt of a strong acid and mono-potassium 1,3-dicyanoguanidine.

13. A method of preparing mono-lauryl isomelamine which comprises the steps of mixing together and heating to a temperature of at least 60° C. at a pH within the range 1 to 9 lauryl amine, mono-potassium 1,3-dicyanoguanidine, and ammonium chloride.

DONALD W. KAISER.
DANIEL E. NAGY.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,222,350 | Keller | Nov. 19, 1940 |

OTHER REFERENCES

Beilstein, vol. 26 (4th edition) p. 247.